United States Patent
Hicks

(10) Patent No.: US 8,407,178 B2
(45) Date of Patent: *Mar. 26, 2013

(54) INCREASING THE DIVERSITY OF ITEM RECOMMENDATIONS BY FILTERING

(75) Inventor: Cory Hicks, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 35 days.

This patent is subject to a terminal disclaimer.

(21) Appl. No.: 13/051,867

(22) Filed: Mar. 18, 2011

(65) Prior Publication Data

US 2011/0173078 A1    Jul. 14, 2011

Related U.S. Application Data

(63) Continuation of application No. 11/941,809, filed on Nov. 16, 2007, now Pat. No. 7,921,071.

(51) Int. Cl.
*G06N 7/00* (2006.01)
*G06N 7/08* (2006.01)

(52) U.S. Cl. .............. 706/52; 707/749; 725/46

(58) Field of Classification Search .......... 707/749; 725/46

See application file for complete search history.

(56) References Cited

U.S. PATENT DOCUMENTS

| | | | |
|---|---|---|---|
| 6,195,657 B1 | 2/2001 | Rucker et al. | |
| 6,266,649 B1 | 7/2001 | Linden et al. | |
| 6,334,127 B1 | 12/2001 | Bieganski et al. | |
| 6,438,579 B1 | 8/2002 | Hosken | |
| 6,912,505 B2 | 6/2005 | Linden et al. | |
| 7,533,093 B2 | 5/2009 | Gutta et al. | |
| 7,542,951 B1 | 6/2009 | Chakrabarti et al. | |
| 7,779,040 B2 | 8/2010 | Hicks | |
| 7,827,186 B2 | 11/2010 | Hicks | |
| 2002/0038307 A1* | 3/2002 | Obradovic et al. | 707/102 |
| 2005/0038717 A1 | 2/2005 | McQueen, III et al. | |
| 2005/0091245 A1 | 4/2005 | Chickering et al. | |
| 2008/0059287 A1* | 3/2008 | Bonet et al. | 705/10 |
| 2008/0243637 A1 | 10/2008 | Chan et al. | |
| 2008/0294617 A1 | 11/2008 | Chakrabarti et al. | |
| 2009/0006398 A1* | 1/2009 | Lam et al. | 707/7 |

OTHER PUBLICATIONS

Schafer, Ben J., et al., "Recommender Systems in E-Commerce," Proceedings of the 1st ACM Conference on Electronic Commerce, ACM Press, Nov. 1999, pp. 158-166 (of-record in the parent application).

Eirinaki, M. et al., "SEWeP: Using Site Semantics and a Taxonomy to Enhance the Web Personalization Process," Proceedings of the Ninth ACM SIGKDD International Conference on Knowledge Discovery and Data Mining, pp. 99-108, ACM Press, Aug. 2003 (of-record in the parent application).

* cited by examiner

*Primary Examiner* — Kakali Chaki
*Assistant Examiner* — Kalpana Bharadwaj
(74) *Attorney, Agent, or Firm* — Knobbe, Martens, Olson & Bear LLP

(57) ABSTRACT

A recommendation system increases the diversity of item recommendations provided to a target user by using item similarity data to filter an initial recommendation set. In one embodiment, selected items are filtered from the initial recommendation set based on similarity scores that represent degrees of similarity between particular items. The similarity scores may be generated based on an automated comparison of item attributes or content, or based on another measure of item similarity.

22 Claims, 5 Drawing Sheets

> Recommended for You

These recommendations are based on items you own and more.

View: All | New Releases | Coming Soon     [More results ▶]

---

1. The Artic Incident (Artemis Fowl, Book 2)
   (February 21, 2007)
   Average Customer Review: ★★★★☆
   Used & new from $3.29
   ☐ I Own It   ☐ Not Interested   x|☆☆☆☆☆ Rate It    [🛒 Add to cart] [Add to Wish List]
   Recommended because you said you owned The Eternity Code (Artemis Fowl, Book 3) and more (edit)

2. Building Robot Drive Trains (Robot DNA Series)
   by Dennis Clark (Author), Michael Owings (Author) (September 11, 2002)
   Average Customer Review: ★★★★☆
   In Stock
   Our Price: $16.47    Used & new from $12.99
   ☐ I Own It   ☐ Not Interested   x|☆☆☆☆☆ Rate It    [🛒 Add to cart] [Add to Wish List]
   Recommended because you said you purchased Robot Builder's Bonanza, Third Edition and more (edit)

3. Eldest (Inheritance, Book 2)    [View more recommended items like this ▶] ~ *56*
   by Christopher Paolini (Author) (March 13, 2007)
   Average Customer Review: ★★★★☆
   In Stock
   Our Price: $9.74    Used & new from $6.95
   ☐ I Own It   ☐ Not Interested   x|☆☆☆☆☆ Rate It    [🛒 Add to cart] [Add to Wish List]
   Recommended because you said you owned Artemis Fowl: Opal Deception (Artemis Fowl (Mass Market)) and more (edit)

4. Pirates of the Caribbean – Dead Man's Chest (Two-Disc Collector's Edition)
   DVD ~Orlando Bloom (December 5, 2006)
   Average Customer Review: ★★★★☆
   In Stock
   Our Price: $24.99    Used & new from $11.13
   ☐ I Own It   ☐ Not Interested   x|☆☆☆☆☆ Rate It    [🛒 Add to cart] [Add to Wish List]
   Recommended because you added Harry Potter and the Deathly Hallows (Book 7) to your Shopping Cart and more (edit)

---

Did you make changes on this page? Refresh your recommendations.    [More results ▶]

*FIG. 4*

INCREASING THE DIVERSITY OF ITEM RECOMMENDATIONS BY FILTERING

PRIORITY CLAIM

This application is a continuation of U.S. application Ser. No. 11/941,809, filed Nov. 16, 2007, the disclosure of which is hereby incorporated by reference.

TECHNICAL FIELD

The present disclosure relates to computer-implemented recommendation systems, such as those used to provide personalized recommendations to users of an e-commerce or other web site.

BACKGROUND

Web sites and other types of interactive systems commonly include recommendation systems for providing personalized recommendations of items stored or represented in a data repository. The recommendations are typically generated based on monitored user activities or behaviors, such as item purchases, item viewing events, item rentals, and/or other types of item selection actions. In some systems, the recommendations are additionally or alternatively based on users' explicit ratings of items.

Traditional collaborative recommendations processes operate by attempting to match users to other users having similar behaviors or interests. For example, once Users A and B have been matched, items favorably sampled by User A but not yet sampled by User B may be recommended to User B. In contrast, content-based recommendation systems seek to identify items having content (e.g., text) that is similar to the content of items selected by the target user.

Other recommendation systems use item-to-item similarity mappings to generate the personalized recommendations. The item-to-item mappings may be generated periodically based on computer-detected correlations between the item purchases, item viewing events, or other types of item selection actions of a population of users. Once generated, a dataset of item-to-item mappings may be used to identify and recommend items similar to those already "known" to be of interest to the target user.

These and other recommendations methods can be used in combination within a given system.

BRIEF DESCRIPTION OF THE DRAWINGS

Specific embodiments of a system for generating improved item recommendations will now be described with reference to the drawings, which are intended to illustrate and not limit the various features of the invention.

FIG. 4 illustrates an example web page that displays filtered item recommendations;

DETAILED DESCRIPTION OF SPECIFIC EMBODIMENTS

One problem with existing recommendations systems is that they tend to generate personalized item recommendations that are overly homogenous. For example, in the context of books, a recommendation system may recommend a number of books by the same author and/or in the same genre to the exclusion of other books that may be of interest to the user. In the context of apparel items, a recommendation engine may recommend two or more shirts that are very similar in appearance. This aspect of existing recommendation systems can inhibit users from finding items of interest, and can lead users to reduce or discontinue use of the recommendation system.

One embodiment of the present disclosure addresses this problem by implementing filtering process to filter out similar but non-duplicate items from an initial recommendation set. By removing such items, the filtering process increases the diversity, and thus the utility, of the recommendations presented to the user. In some embodiments, the user may be presented with an option to view the filtered out item or items corresponding to a particular recommended item.

Figure 1:
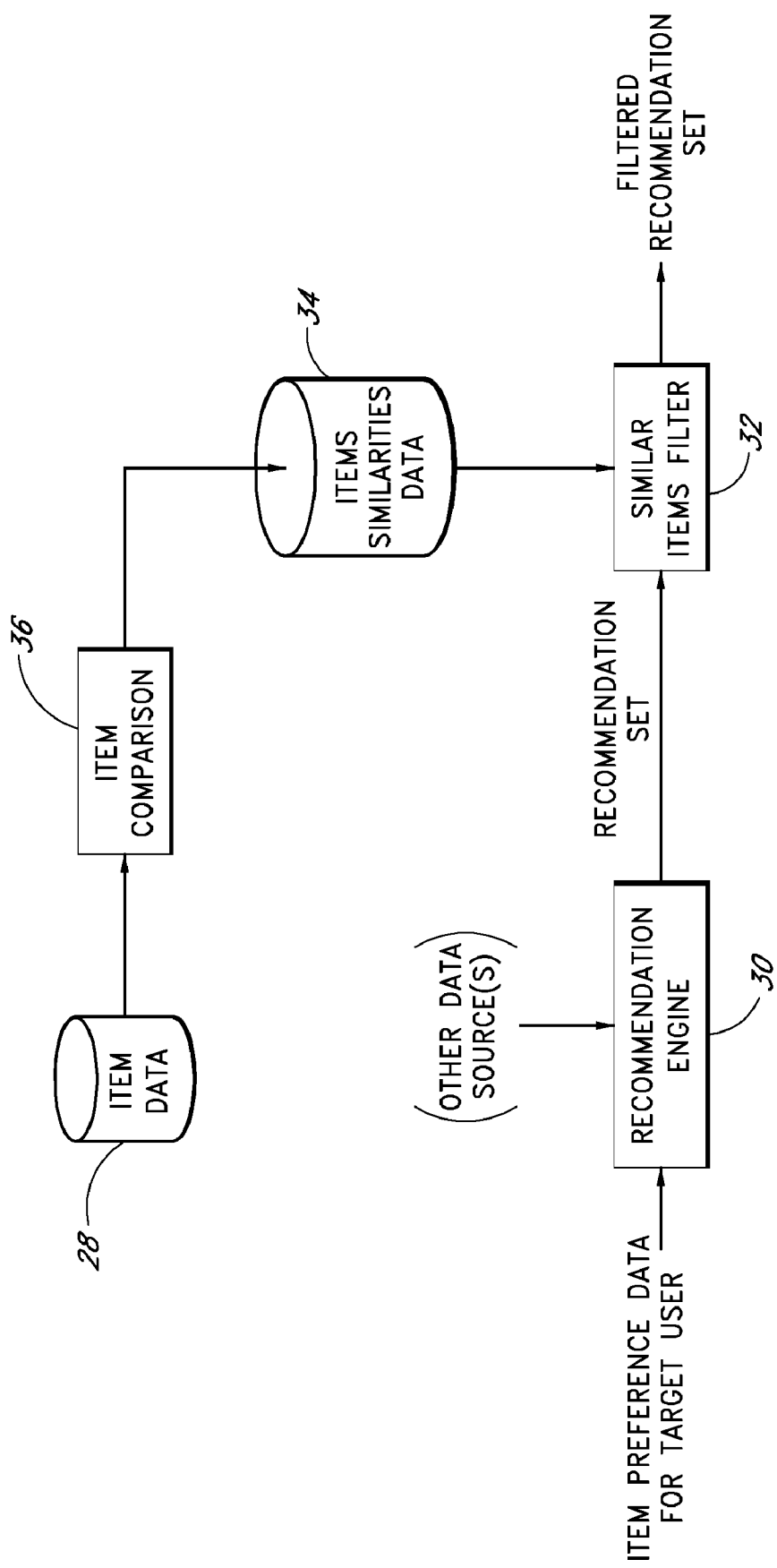
FIG. 1 illustrates a recommendation system according to one embodiment.

FIG. 1 illustrates the primary components of an improved recommendation system according to one embodiment. The recommendation system may, for example, be part of a web site system, interactive television system, in-store kiosk, or other type interactive system that provides access to an electronic repository of items, or may be implemented as a web service that can be accessed over the Internet. The recommendation system generates personalized recommendations of items represented or stored in an electronic data repository 28. The items can include, for example, physical products (e.g., books, DVDs, consumer electronics items, etc.), downloadable works (e.g., music files, video/movie files, e-books, journal articles, etc.), news articles, news feeds, blogs, blog entries, podcasts, web sites, magazine subscriptions, and/or any other type of item that can be stored or represented in a database 28. For purposes of illustration, the recommendation system will be described primarily in the context of a web site that provides personalized recommendations of items represented in an electronic catalog. Throughout this description, the term "item" is used somewhat interchangeable to refer to both the actual item (e.g., a physical product) and its representation within a computer (e.g., a product identifier or product description stored in computer memory), although one of these two meanings may be implied by the surrounding context.

The recommendation system includes a recommendation engine 30 that generates personalized item recommendations based on item preference data for particular users. A conventional recommendation engine may be used, and no particular type of recommendation engine or algorithm is required. In the illustrated embodiment, the recommendation engine 30 operates by receiving item preference data for a target user, and by using this data, in combination one or more other types of data (e.g., data regarding behavioral associations between particular items), to generate and output personalized item recommendations for the target user. This initial set of recommended items, or a computer representation of this set of items, is referred to herein as the "recommendation set."

Before the recommendation set (or a portion thereof) is presented to the target user, it is effectively passed through a similar items filter 32 that identifies any items that are "too similar" to be recommended in combination. When such item pairs are identified, one item from each such pair may be filtered out. By removing such items, the system increases the diversity, and thus the utility, of the personalized recommendations ultimately presented to the target user. Although the similar items filter 32 is shown in FIG. 1 as being distinct from the recommendation engine 30, it may, in some embodiments, be an integral component of the recommendation system 30.

The recommendation engine 30 may generate the personalized recommendations using any type or types of data reflective of the item preferences of the target user. For example, the recommendation engine 30 may use any one or more of the following types of item preference data: (a) the item purchase history, item rental history, item viewing history, and/or item download history of the target user, (b) ratings assigned to particular items by the target user (e.g., on a scale of 1 to 5), (c) a list of items currently in an electronic shopping, in an electronic video/movie rental queue, or on an electronic wish list, of the target user, (d) a list of items the user has reviewed or has identified as owning, (e) a list of items the user has designated as "not interested," (f) tagging data (e.g., item_ID/tag pairs) representative of textual tags attached to particular items by the target user, (g) search terms/phrases used by the target user to conduct electronic catalog searches, (h) item category preferences explicitly specified by the target user or derived from one or more of the foregoing. These and other forms of item preference data may be maintained automatically by the system that hosts the recommendation engine, or may be obtained from external sources.

In the embodiment of FIG. 1, the similar items filter 32 uses a data repository of pre-generated item similarities data 34 to assess whether any items should be filtered from the recommendation set. (As discussed below, the similar items filter 32 may alternatively calculate item similarity scores or distances on-the-fly as recommendations are generated.) The item similarities data may, for example, be stored in a table or other data structure that maps items to similar items. As illustrated, the item similarities database 34 may be generated periodically by an item comparison process or system 36 that uses a database 28 of item attribute data or item content to calculate attribute-based item similarity scores for particular item pairs. In one embodiment, when an item pair's similarity score exceeds a particular threshold (meaning the items should not be recommended in combination), the item comparison system 36 records the item pair in the database of item similarity data 34. The task of comparing the similarity scores to a threshold may additionally or alternatively be performed by the similar items filter 32 using similarity score values stored in the database 34.

Any of a variety of known methods for comparing item attributes or content may be used to generate the item similarity scores. For example, techniques from natural language processing such as simple inter-document term frequency or more complicated algorithms such as latent semantic analysis may be used. Also, pattern recognition techniques such as neural networks or Bayesian belief networks operating over the content feature space may be used. Specific examples of methods that may be used to generate attribute-based item similarity scores are disclosed in U.S. application Ser. No. 11/863,987, filed Sep. 28, 2007, the disclosure of which is hereby incorporated by reference. The item similarities reflected in the database 34 may additionally or alternatively be based on behavioral associations between the items (e.g., users who view item A also view item B).

Figure 2:
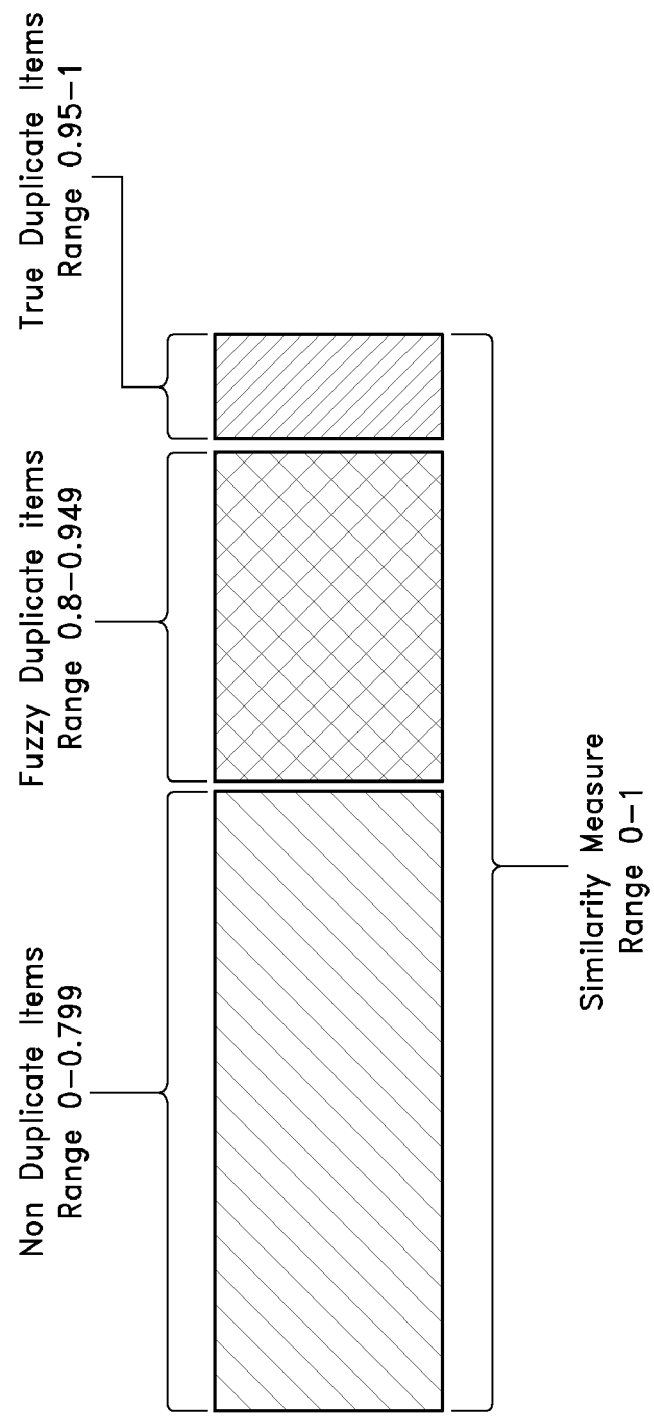
FIG. 2 illustrates how item similarity scores can be used to classify item pairs.

FIG. 2 illustrates how similarity scores on a scale of 0 to 1 may be used to classify a given item pair into one of three categories: true duplicates, fuzzy duplicates, or non-duplicates. In this example, the two items of a given pair are regarded as true duplicates (meaning they will likely be perceived by users as duplicates) if their similarity score is in the range of 0.95 to 1. Examples include two iPod Shuffles that differ only in color, or two different versions of the same book title (e.g., hardcover and paperback). In some systems, true duplicates can also result when two database entries exist for the same item; for instance, two different merchants of an electronic marketplace system may upload item descriptions for the same product, but may use slightly different terminology to describe this product.

In some embodiments, the database 28 of items that can be recommended is pre-filtered to eliminate all true duplicates. In such embodiments, the recommendation engine 30 will not generate a recommendation set with two items that, based on their similarity score, are true duplicates of each other. In other embodiments, the task of preventing true duplicates from being recommended together is performed by the similar items filter 32 when recommendations are generated.

With further reference to FIG. 2, the two items of a given pair are regarded as near or "fuzzy" duplicates of each other if their similarity score is 0.8 to 0.949. Users would ordinarily perceive these items as being very similar to, but not duplicates of, each other. An example would be two different short-sleeve pink shirts. In one embodiment, the recommendation filter 32 filters out one item of each fuzzy duplicate item pair encountered in the recommendation set. In some embodiments, however, a particular fuzzy duplicate item pair may be retained in the recommendation set if a particular exception condition is met. For instance, the pair may be retained if the two items have a strong purchase-based association, meaning that the two items are purchased in combination relatively frequently.

As further shown in FIG. 2, the two items of a given pair are regarded as non-duplicates of each other if their similarity score is 0 to 0.799. These items will typically be perceived by users as not being duplicates, and as not being very similar. In one embodiment, the recommendations filter 32 ensures that every item in the filtered recommendation set is a non-duplicate of every other item in the filtered recommendation set. As mentioned above, however, some fuzzy duplicate item pairs may intentionally be retained in certain circumstances.

The ranges shown in FIG. 2 are merely illustrative. The actual ranges used may be varied based on the particular similarity metric(s) used, and/or based on the degree of diversity desired in the filtered recommendation set. In addition, a greater or lesser number of ranges may be used. Further, rather than using hard cutoffs or ranges, a probabilistic filtering algorithm may be used in which the probability that a given item will be filtered out is directly proportional to its degree of similarity to one or more other items in the recommendation set.

The system may also enable users to effectively control the degree of filtering performed. For instance, the system may generate recommendation pages having a slider control that can be adjusted by the end user to effectively adjust a score threshold used for filtering. By adjusting this slider in one embodiment, the user can interactively cause filtered-out items to become exposed on a recommendations page.

Figure 3:
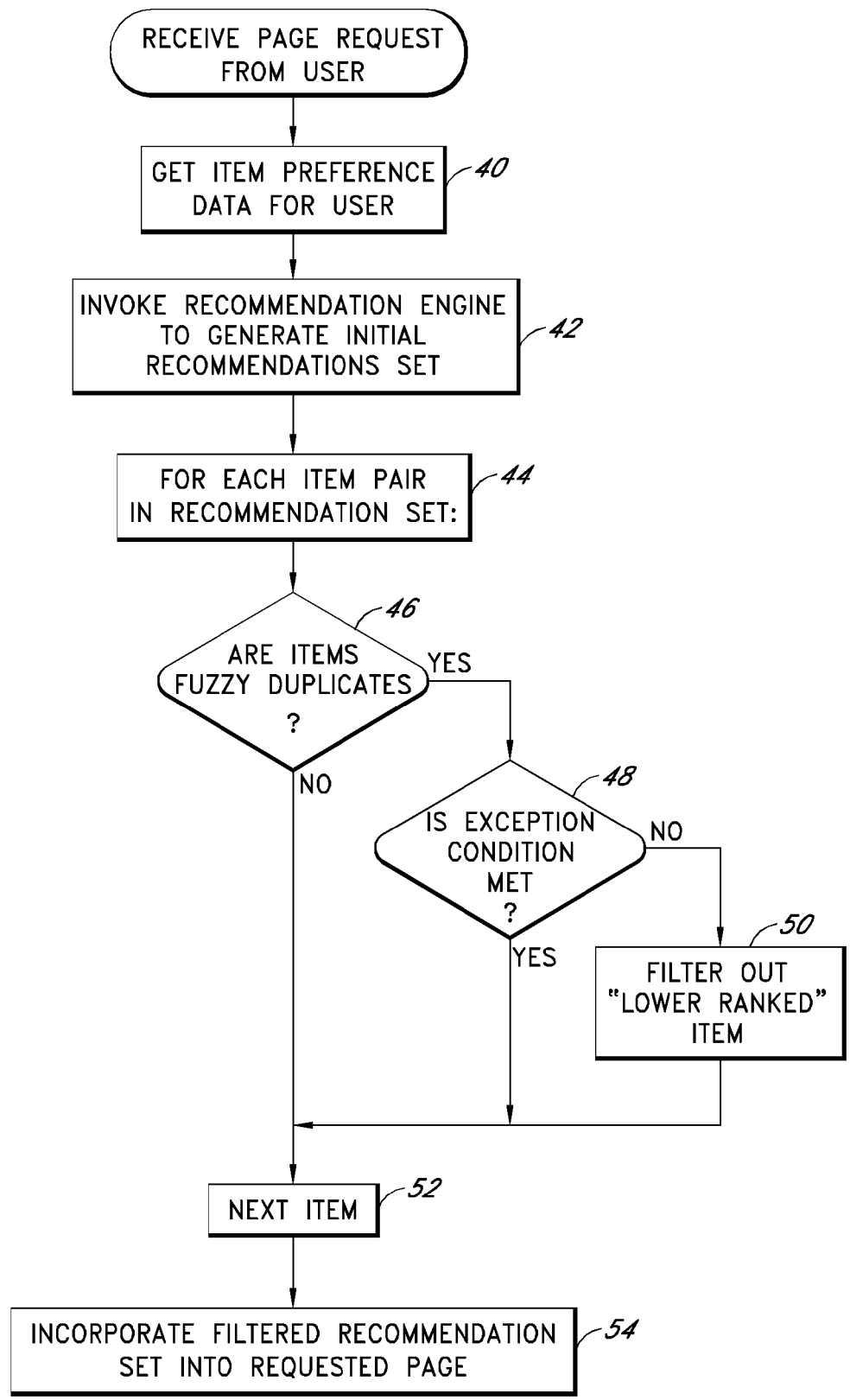
FIG. 3 illustrates a process for generating filtered personalized recommendations according to one embodiment.

FIG. 3 illustrates one example of a process that may be performed by the recommendation system to generate a set of filtered recommendations for a user. In this example, the item recommendations are generated in real time in response to a page request, and are included on the requested page. This example also assumes that no true duplicates exist in the repository of items 28 capable of being recommended. In block 40, the process looks up item preference data for the user. The type of item preference data used may vary depending upon the context of the page request. For example, if the user clicks on a link for viewing a shopping cart, the contents of the shopping cart may be used as the item preference data, and the resulting (filtered) recommendations may be presented on the shopping cart page. When, on the other hand, the user clicks on a link for viewing personalized recommendations, the user's item purchase history and/or item ratings may be used as the item preference data.

In block 42, the recommendation engine 30 uses the item preference data to generate an initial set of personalized item recommendations. Any of a variety of recommendation algorithms may be used for this purpose. As one example, the recommendation set may be generated using a preexisting database that maps items to related items. These item-to-item mappings may be based on behavioral associations detected by analyzing user purchase histories, users' item viewing histories, and/or other types of user activity data. Examples of recommendation methods that use this approach are described in U.S. Pat. No. 6,912,505, the disclosure of which is hereby incorporated by reference. As another example, the recommendations may be generated using a traditional collaborative recommendations algorithm that maps the target user to one or more other users having similar item preferences, and then recommends items sampled favorably by these similar users. As yet another example, the recommendations may be generated based on attribute-based or content-based relationships between the items. The present invention is not limited to these recommendation methods or to any other particular type of recommendation method.

In blocks 44-52, the process considers each possible pairing of items in the recommendation set, and determines whether the two items are fuzzy duplicates (or in some embodiments, are at least fuzzy duplicates). When a pair of fuzzy duplicate items is encountered in this example, one of the two items is filtered out (block 50) unless an exception condition is met (block 48). As mentioned above, one example of an exception condition is the existence of a strong purchase-based association between the two items (e.g., a relatively large number of those who purchase the first item also purchase the second item). For example, a purchase-based association score may be generated for the fuzzy duplicate pair using the methods described in U.S. Pat. No. 6,912,505, and the pair may be retained if this score exceeds a selected threshold. As another example, an exception condition may exist if another type of behavioral association exists between the fuzzy duplicate items (e.g., a rental-based, viewing-based, download-based, or wish list co-occurrence based association), or if the recommendation set falls below a threshold size.

As depicted in block 50 of FIG. 3, a ranking scheme may be used to select between the two fuzzy duplicate items. For example, the process may retain the item having the highest popularity level, the highest recommendation score (assuming the recommendation engine 30 returns such a score for each item), the highest sales rank, the most recent release date, the highest recommendation conversion rate, or the highest inventory level. These and other criteria may be used in combination to select between the two fuzzy duplicate items. A random or probabilistic selection method may additionally or alternatively be used.

As mentioned above, the task of identifying and filtering out the fuzzy duplicate items (blocks 46-50) may be performed using item distances calculated on-the-fly as recommendation sets are generated. For example, distances between the items in the recommendation set may initially be calculated based on the locations of the items in a browse hierarchy, and/or based on other item attributes. These item distances may then be used to form clusters of items, and these clusters may then be pruned until every remaining item is at least some threshold distance from every other item. Examples of item distance calculations and clustering methods that may be used for this purpose are described in U.S. application Ser. No. 11/694,707, filed Mar. 30, 2007, the disclosure of which is hereby incorporated by reference. With this approach, the similar items filter 32 calculates item similarities/distances on-the-fly rather than using a preexisting database of item similarities data. A hybrid of these two approaches is also contemplated.

The filtering process may be performed so as to minimize the number of items filtered from the recommendation set. For example, in one embodiment, if A and B are fuzzy duplicates and B and C are fuzzy duplicates, and neither A nor C is a fuzzy duplicate of any other item in the recommendation set, then only B would be filtered out.

Once the filtering process is complete, the filtered recommendation set (or a portion thereof) is presented to the user (block 54). This task may involve incorporating descriptions of the items in the filtered recommendation set, or a top-ranked subset of these items, into the requested web page, and transmitting the page to the user's computing device. In some embodiments, one or more links may also be incorporated into the page for enabling the user to view the filtered-out item(s). This feature is depicted in FIG. 4, which illustrates an example recommendations page. In this example, the third recommended item in the list (the book title "Eldest") is displayed together with a link/button 56 for viewing similar items that were removed. This link 56 is included in this example because one or more fuzzy duplicates of "Eldest" were filtered from the recommendation set. User selection of this link 56 causes the user's browser to display the filtered-out items that are fuzzy duplicates of the "Eldest" item, or, in some embodiments, to display all fuzzy duplicates of this item. The fuzzy duplicates may be displayed on a separate web page served by the web servers 62 (optionally in a new window), or may be displayed on the original recommendations page in a region that becomes exposed when the user selects the link 56 (e.g., the page may expand to reveal the fuzzy duplicate items). As mentioned above, the page could alternatively be provided with a slider that can be adjusted by the user to control the display of the similar items.

In some embodiments, the task of removing fuzzy duplicates may be applied only to the portion or portions of the recommendation set actually presented to the user. For example, when a user requests recommendations in some systems, the recommendation engine 30 returns a ranked recommendation set typically containing hundreds or thousands of items; however, only a relatively small number (e.g., 10 or 20) of these items are presented to the user on the initial recommendations page, and additional items are presented only if the user selects a link or button for viewing additional recommendations. In these types of systems, the task of removing fuzzy duplicates may be performed only to the extent necessary to generate the recommendation page or pages actually served to the user. Stated differently, the recommendation set to which filtering is applied may consist of a subset of the items returned by the recommendation engine 30 (e.g., the top 64 items).

Further, in some embodiments, the filtering task (block 50 in FIG. 3) may involve re-ranking, rather than actually eliminating, particular items. For instance, suppose the initial recommendation set contains two items that are fuzzy duplicates of each other, and these two items are ranked such that they will both appear on the initial recommendations page. Rather than completely eliminating either item, one item may be moved to a lower position in the overall recommendation set, such that it does not appear on the first few recommendation pages. Stated differently, one item may be eliminated from the recommendation set presented on a particular recommendation page, but may still be eligible for display on a different recommendation page.

Figure 5:
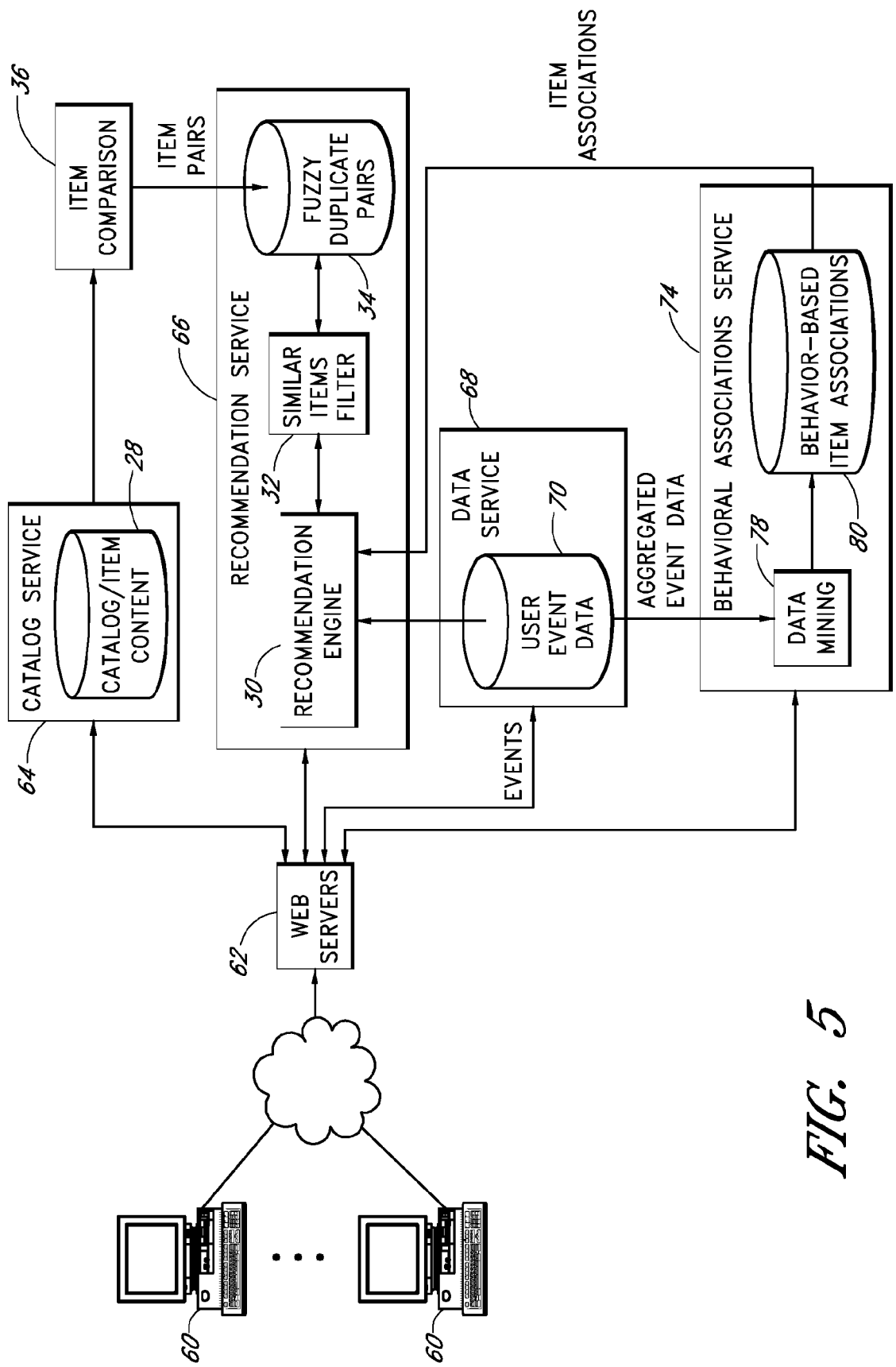
FIG. 5 illustrates one example of how the recommendation system of FIG. 1 may be incorporated into a web site system that provides access to an electronic catalog of items.

FIG. 5 illustrates one example of how the recommendation system of FIG. 1 may be incorporated into a web site system that provides access to an electronic catalog of items. The web site system includes one or more web servers 62 that respond to page requests from user computing devices 60 by generating and returning web pages of a web site. The web servers 62 communicate with a catalog service 64, a recommendation service 66, a data service 68, and a behavioral associations service 74. The web site system may also include a variety of other services, such as services for executing item purchase transactions, conducting catalog searches, creating electronic wish lists, etc.

The catalog service 64 maintains and provides access to a database of catalog content 28 for the various items included in the electronic catalog. Typically, the items are arranged in this database 28 according to a hierarchy or "browse tree" of categories. The item data stored for each item may, for example, include a textual description of the item, an image of the item, the item's price, and/or other types of information commonly included in an electronic catalog. The textual description of the item may be represented in the database 28 as a set of name-value pairs for specific item attributes. The types of attributes stored for a given item may vary from item to item, and may include, for example, name, description, price, manufacturer, color, browse node, author, etc. As illustrated (and as described above with reference to FIG. 1), this attribute data may be analyzed by an item comparison component or system 36 to identify items that are fuzzy duplicates. The identified fuzzy duplicate item pairs (optionally excluding those that meet an exception condition, as described above) are recorded in a "fuzzy duplicate pairs" data repository 34 of the recommendation service 66. This data repository 34 is used by the similar items filter 32 to check for fuzzy duplicate items pairs in recommendation sets generated by the recommendation engine 30.

The data service 68 stores data regarding events performed by users, including item-specific events reflective of user preferences for particular catalog items. For example, the data service 68 may maintain user-specific item purchase histories, item rental histories, item viewing histories, catalog search histories, item ratings, and various other types of event data. Some or all of these types of events may be reported to the data service by the web servers 62, and/or by other services, as corresponding user actions are performed.

The behavioral associations service 74 includes a data mining component or system 78 that detects/quantifies behavioral associations between particular items by analyzing one or more types of user event data on an aggregated basis. Item pairs for which a threshold level of behavioral association exists are recorded in a database 80 that maps items to behaviorally associated items. Different mappings may be generated for different types of behaviors/events. For example, a purchased-based mapping may be generated based on user purchase histories, and a view-based mapping may be generated based on users' item viewing histories. In the embodiment depicted in FIG. 5, the behavior-based item associations are used by the recommendation engine 30 to generate personalized recommendations of catalog items. Although not depicted in FIG. 5, these behavioral associations may also be used (1) to detect fuzzy duplicates for purposes of similar item filtering, and/or (2) to identify fuzzy duplicate item pairs that satisfy a purchase-based or other exception condition (see block 48 in FIG. 3).

In operation, when a recognized user requests a web page that is designed to display personalized item recommendations, the web server 62 requests recommendations for this user from the recommendation service 66. The recommendation service 66 then retrieves one or more types of data from the data service 68 regarding item preferences of the user. For example, the recommendation service 66 may retrieve a list of items the user has purchased, rented, rated highly, added to a shopping cart, or added to a wish list. The recommendation engine 30 then uses this item preference data, in combination with item-to-item similarity mappings obtained from the behavioral associations service 74, to generate a recommendation set. This recommendation set is then filtered by the similar items filter 32, and the resulting list of recommended items is returned to the web server 62. The web server 62 then may retrieve catalog data for these items, or a top-ranked subset of these items, from the catalog service 64 for incorporation into the requested web page. Finally, the web server 62 sends the requested web page to the user.

When the recommendation service 66 returns the list of recommended items to the web server 62, it may, in some embodiments, tag any items of which one or more fuzzy duplicates were filtered out. For each tagged item, the web server 62 may then insert a link 56 (FIG. 4) for viewing fuzzy duplicates of this item. The recommendation service 66 may also return identifiers of the filtered out items, in which case the web server 62 may do one of the following: (1) incorporate descriptions of these filtered out items into a hidden page area that is exposed when the user selects the corresponding "view more recommended items like this" link 56 or adjusts a slider; (2) incorporate these filtered-out-item identifiers into link coding such that selection of the link 56 causes the browser to transmit a list of the filtered-out items to the web servers 62; or (3) cache these item identifiers in server memory for use if/when the user selects the link 56.

Although depicted as part of a web site system in FIG. 5, the recommendation system (including the recommendation service 66, data service 68 and behavioral association service 74) may alternatively be implemented as an independent entity, such as a web service that is not tied to any particular web site. In such embodiments, the recommendation system may communicate with the servers of a number of different independent web sites, and may generate filtered item recommendations for display on pages of such web sites. An Application Program Interface (API) may be provided through which the servers of these web sites report user events to, and request recommendations from, the recommendation system over the Internet.

Further, the similar items filter 32 may itself be implemented as a distinct web service that can be accessed over the Internet. With such a web service, a web site operator/merchant could use a commercially available recommendation engine to generate recommendation sets for its customers, and could pass these recommendation sets (lists of items) to the filtering web service via an API/web services call. The filtering web service would respond by returning filtered recommendation sets. The filtering web service could also include one or more API methods for enabling the web site operator to post its catalog data to the web service for analysis and detection of fuzzy duplicates.

Each component shown in FIGS. 1 and 5 may be implemented as a combination of computer hardware and software. For example, the recommendation engine 30, similar items filter 32, and item comparison system 36 shown in FIG. 1 may each be implemented as an executable code module or program executed by one or more general purpose computers or processors. The code modules may be stored in any type of computer storage (e.g., hard disk drive storage, solid state random access memory, etc.). The various data repositories 28, 34, 70, 78 may be implemented using databases, flat files, and/or other types of storage architectures, and using any type of storage device. The various functions described above, including those depicted in FIG. 3, may be embodied in, and fully automated by, code modules executed by one or more computers.

Although this invention has been described in terms of certain embodiments and applications, other embodiments and applications that are apparent to those of ordinary skill in the art, including embodiments and applications that do not provide all of the benefits described herein, are also within the scope of this invention. The scope of the invention is defined only by the claims, which are intended to be construed without reference to any definitions that may be explicitly or implicitly included in any of the incorporated-by-reference materials.

What is claimed is:

1. A computer-implemented method, comprising:
retrieving item preference data for a target user from computer storage, said item preference data reflective of item preferences of the target user;
generating a recommendation set using the retrieved item preference data, said recommendation set comprising a computer representation of items predicted to be of interest to the target user;
filtering the recommendation set, wherein filtering the recommendation set comprises filtering out a first item from the recommendation set based at least partly on a determination that the first item has at least a threshold degree of similarity to a second item in the recommendation set, said first and second items not being duplicates of each other, said filtering producing a filtered recommendation set that has a higher degree of item diversity than the recommendation set; and
outputting at least a portion of the filtered recommendation set for presentation to the target user with a display element that enables the target user to initiate a display of one or more items, including said first item, that were filtered from the recommendation set;
said method performed by a computer system that comprises one or more computers.

2. The method of claim 1, wherein the display element is a slider control the enables the target user to interactively control the display of filtered-out items similar to items in the filtered recommendation set.

3. The method of claim 1, wherein the display element corresponds to the second item, and enables the target user to initiate the display of one or more filtered-out items that are similar to the second item.

4. The method of claim 1, wherein the method comprises comparing item attributes of the first and second items to determine whether said threshold degree of similarity is met.

5. The method of claim 1, wherein the method comprises (1) generating a similarity score that represents a degree of similarity between the first and second items, said similarity score reflecting a degree to which attributes of the first and second items are the same, and (2) using the similarity score to determine whether to filter out one of said first and second items.

6. The method of claim 1, wherein the first item is filtered out based additionally on a determination that the first item is ranked lower than the second item.

7. The method of claim 1, wherein the first item is filtered out based additionally on a determination that the first item and second item do not satisfy an exception condition that, if met, would permit the first and second items to be recommended in combination.

8. The method of claim 1, wherein filtering the recommendation set comprises using attribute-based item similarity scores to select items to filter from the recommendation set, each attribute-based item similarity score corresponding to a respective item pair.

9. The method of claim 1, wherein generating the recommendation set comprises using behavioral associations between items to select, for inclusion in the recommendation set, items that are behaviorally associated with items previously selected by the target user, said behavioral associations based on recorded behaviors of a plurality of users.

10. The method of claim 1, wherein the items are products represented in an electronic catalog.

11. A system for generating recommendations, the system comprising:
a data repository of item data, said item data including item attributes of a plurality of items;
an item comparison system configured to use the item data, including the item attributes, to generate similarity scores for particular item pairs, each similarity score representing a degree to which two particular items are similar to each other;
a data repository of item similarity data, said item similarity data identifying item pairs associated with similarity scores satisfying a selected threshold;
a recommendation engine configured to generate a recommendation set based on user preference data associated with a target user, said recommendation set comprising a computer representation of items predicted to be of interest to the target user;
a similar items filter configured to use the data repository of item similarity data to identify, in said recommendation set, one or more item pairs whose respective similarity scores satisfy said threshold, said similar items filter additionally configured to filter out, from the recommendation set, one item of each such identified item pair, to thereby prevent certain items from being recommended to the target user in combination, said similar items filter comprising a processor; and
a server configured to generate, for display to the target user, a page that lists at least a portion of the filtered recommendation set, said page including one or more display elements for enabling the target user to initiate the display of one or more items filtered out from the recommendation set.

12. The system of claim 11, wherein the similar items filter is capable of filtering out a first item from the recommendation set based at least partly on a determination that the first item has a threshold degree of similarity to a second item in the recommendation set, said first and second items not being duplicates of each other.

13. The system of claim 11, wherein the one or more display elements for enabling the target user to initiate the display of one or more items filtered out from the recommendation set comprises a slider control that is adjustable by the target user.

14. The system of claim 11, wherein the one or more display elements includes, for a first item in the filtered recommendation set, a display element for initiating the display of at least one filtered-out item that is similar to said first item.

15. The system of claim 11, wherein the recommendation engine is operative to use behavior-based associations between items to generate the recommendation set.

16. Physical computer storage that stores executable code that directs a computing system to at least:

receive a recommendation set generated by a recommendation engine, said recommendation set comprising a computer representation of a plurality of items predicted to be of interest to a target user;

filter the recommendation set to increase a degree of item diversity of the recommendation set, said filtering comprising filtering out a first item from the recommendation set based at least partly on a determination that the first item has at least a threshold degree of similarity to a second item in the recommendation set, said first and second items not being duplicates of each other; and output at least a portion of the filtered recommendation set for presentation to the target user with a display element that enables the target user to initiate a display of one or more items, including said first item, that were filtered from the recommendation set.

17. The physical computer storage of claim 16, wherein the executable code directs the computing system to generate, for presentation to the target user, a display page that includes (1) a listing of items in the filtered recommendation set, and (2) said display element.

18. The physical computer storage of claim 16, wherein the executable code directs the computing system to compare item attributes of the first and second items to determine whether said threshold degree of similarity is met.

19. The physical computer storage of claim 16, wherein the executable code directs the computing system to (1) generate a similarity score that represents a degree of similarity between the first and second items, said similarity score reflecting a degree to which attributes of the first and second items are the same, and (2) use the similarity score to determine whether to filter out one of said first and second items.

20. The physical computer storage of claim 16, wherein the display element is a slider control that is adjustable by the target user to control a degree to which items filtered from the recommendation set are displayed.

21. The physical computer storage of claim 16, wherein the display element is specific to the second item, and is selectable by the target user to initiate the display of at least one filtered-out item that is similar to the second item.

22. The physical computer storage of claim 16, wherein the executable code directs the computing system to select, for filtering from the recommendation set, between the first item and the second item based at least partly on respective rankings of the first and second items.

* * * * *